United States Patent [19]
Hashimoto et al.

[11] Patent Number: 5,195,105
[45] Date of Patent: Mar. 16, 1993

[54] SPREAD SPECTRUM RECEIVER

[75] Inventors: Takeshi Hashimoto; Yoshitaka Uchida, both of Tokyo, Japan

[73] Assignee: Clarion Co., Ltd., Tokyo, Japan

[21] Appl. No.: 720,723

[22] Filed: Jun. 25, 1991

[30] Foreign Application Priority Data

Jun. 26, 1990 [JP] Japan .................. 2-167933

[51] Int. Cl.⁵ ............................ H04L 27/30
[52] U.S. Cl. ........................ 375/1; 380/34
[58] Field of Search .................. 375/1; 380/34

[56] References Cited

U.S. PATENT DOCUMENTS 4,926,440  5/1990  Mikoshiba et al. ............ 375/1
5,038,363  8/1991  Mitsutsuka .................... 375/1

FOREIGN PATENT DOCUMENTS 1-188044  7/1989  Japan .
2-207605  8/1990  Japan .
2-207630  8/1990  Japan .

OTHER PUBLICATIONS

Copy of Originally-Filed Specification and Drawings of U.S. Ser. No. 07/472 089.
Copy of Originally-Filed Specification and Drawings of U.S. Ser. No. 07/475 185.

Primary Examiner—Bernarr E. Gregory
Attorney, Agent, or Firm—Flynn, Thiel, Boutell & Tanis

[57] ABSTRACT

A spread spectrum receiver is disclosed, in which influences of narrow band disturbing waves are reduced by converting the output of a correlator into base band information and removing frequency components from DC to about $1/\tau$ from the conversion output thus obtained, $\tau$ being the gate delay time of the correlator.

4 Claims, 6 Drawing Sheets

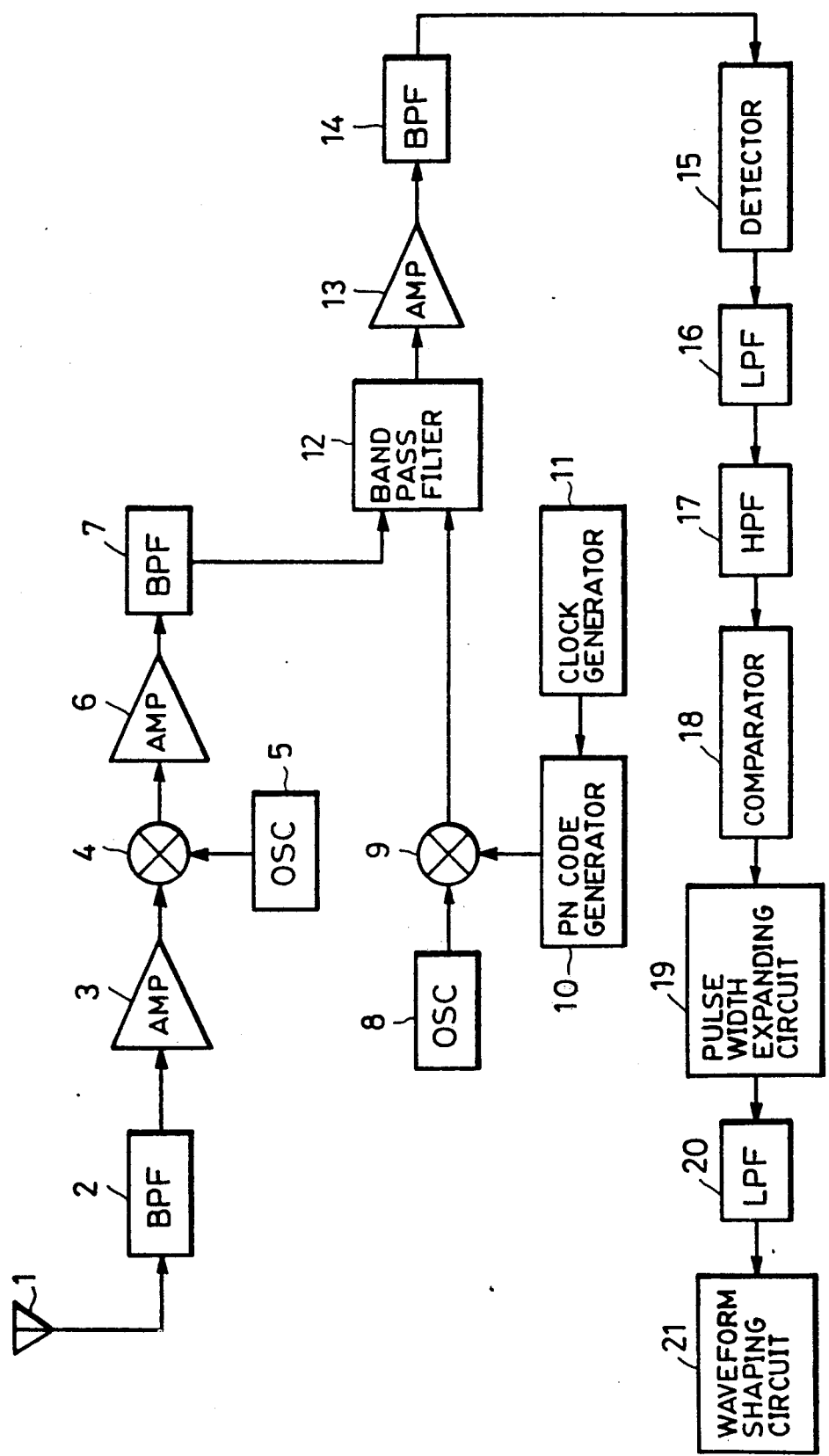

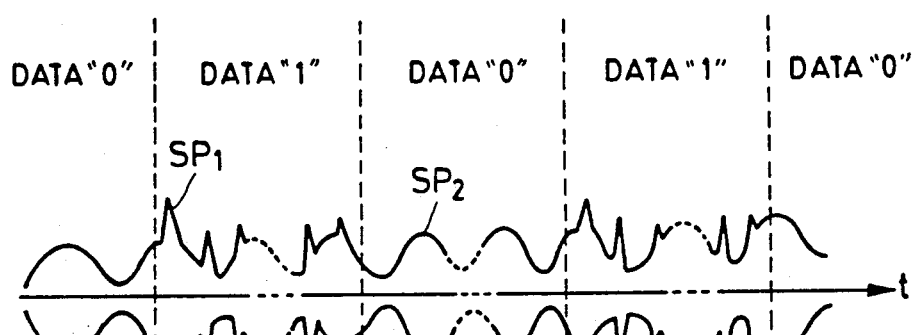
FIG. 5(a)
FIG. 5(b)
FIG. 5(c)
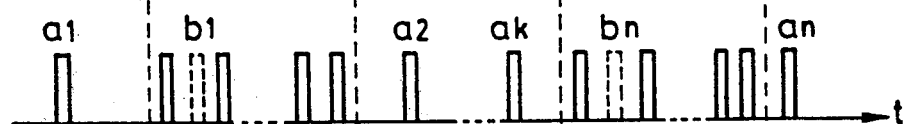
FIG. 5(d)
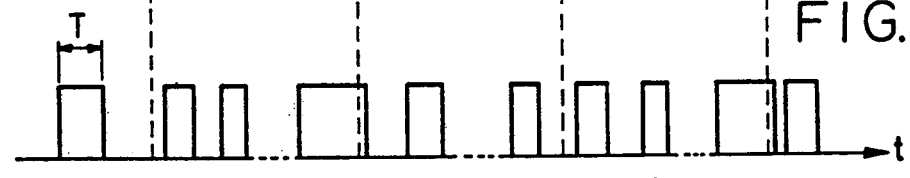

SPREAD SPECTRUM RECEIVER

FIELD OF THE INVENTION

The present invention relates to an improvement for reducing influences of narrow band disturbing waves on a spread spectrum receiver.

BACKGROUND OF THE INVENTION

Heretofore various systems have been studied and developed as communication systems. As one of them there is known the spread spectrum communication system (hereinbelow called simply SS communication system).

In this SS communication system, on the transmitter side, a signal such as narrow band data, voice, etc. is spread in a wide band spectrum by means of a pseudo noise code (PN code) to be transmitted and on the receiver side the signal is reproduced by inversely spreading the wide band signal in the original narrow band signal by means of a correlator.

It is known that this SS communication system is resistant to external interference and noise and in particular with respect to a narrow band disturbing wave, e.g. to a continuous wave (CW) it has an excluding power of process gain (PG). The process gain can be given by a following formula;

$$PG = \frac{\text{radio frequency band width}}{\text{information speed}}$$

where the radio frequency band width described above means the band width of the transmitted SS signal and the information speed is a data speed in the base band channel.

A receiver section of such a communication device using the SS communication system (SS communication device) is disclosed in U.S. Pat. No. 4,926,440. In the receiver section of this SS communication device, as indicated in FIGS. 1A and 1B of the USP stated above, data are restored through a BPF (band pass filter), an amplifier, an envelope detector, a comparator circuit and a pulse width enlarging circuit connected with the output of a surface acoustic wave (hereinbelow abbreviated to SAW) convolver. Output waveforms of different parts are as indicated in FIG. 3 of the USP stated above.

Here, in an SS communication device having the construction described above, when a received signal, in which narrow band disturbing waves, e.g. CW, are mixed in the band of the SS signal, enters the correlator, the waveform at the output of the correlator is a waveform, in which a convolution integration result of the SS signal in the received signal and the SS signal in the reference signal, i.e. an envelope of correlation spikes $SP_1$, and a convolution integration result of CW in the received signal and the reference signal, i.e. an envelope of spurious noise $SP_2$, are superposed on each other, as indicated in FIG. 5(a). This remains unchanged, as indicated in FIG. 5(b), even after the correlation output when variations are produced in such correlation spikes and spurious noise is envelope-detected.

In such a state, in the case where a reference voltage is set and the correlation spikes are converted into binary values by means of the comparator circuit indicated in FIG. 6 in the USP stated above, the correlation spikes and the spurious noise cannot be separated. For this reason, erroneous judgment can take place that there are no correlation spikes, although there are $(b_1 \sim b_n)$, as indicated in FIG. 5(c) in the USP stated above, or that there are correlation spikes, although there are not $(a_1 \sim a_n)$. In this way, in the case where signals obtained by shaping waveform of such correlation spikes (correlation pulses) converted into binary values by means of a pulse width enlarging circuit are used for reproducing data, erroneous data are reproduced, depending on sample points $S_1 \sim S_3$, as indicated in FIG. 5(d), which worsens the error rate.

For this reason, a receiver by the system indicated in FIGS. 9A and 9B in the USP stated above has been proposed in order to remove this drawback in the prior art technique described above.

By this system, the output of the pulse width enlarging circuit is integrated through an LPF (low pass filter) and a signal thus integrated is shaped in the waveform by a waveform shaping circuit to reproduce the data. However, also in this case, erroneous data are reproduced similarly to the preceding case, if there are many erroneous judgments in the comparator circuit, as indicated in FIG. 5(c) stated above.

FIG. 5(a) indicates a case where, when correlation spikes are superposed on spurious noise in a time region, the phase relation of the correlation spikes with respect to the spurious noise at the peak point of the correlation spikes is in a region of $-\pi/2 \sim \pi/2$. However it is also conceivable that they are superposed on each other in a region of $\pi/2 \sim 3\pi/2$.

In the case of the region of $-\pi/2 \sim \pi/2$, the correlation spikes are superposed on the spurious noise in the direction, in which the sum thereof is additive, and the maximum is produced at the same phase (0), as indicated in FIG. 6(a), the level thereof being equal to the level of the spurious noise + the level of the correlation spikes.

In the case of the region of $\pi/2 \sim 3\pi/2$, the correlation spikes are superposed on the spurious noise in the direction, in which the sum thereof is subtractive, and the minimum is produced at the opposite phase ($\pi$), as indicated in FIG. 6(b), the level thereof being equal to the level of the spurious noise − the level of the correlation spikes.

As described above, when the correlation spikes are superposed on the spurious noise, by the comparator circuit by the system indicated in FIG. 6 of the USP stated above, only the case of superposition in the region of $-\pi/2 \sim \pi/2$ can be detected, which can be a cause of worsening of the data reproduction.

OBJECT OF THE INVENTION

The object of the present invention is to improve further the receiver disclosed in the older application described above and to provide an SS receiver capable of reducing influences of narrow band disturbing waves, having a good communication quality.

SUMMARY OF THE INVENTION

In order to achieve the above object, an SS receiver according to the present invention is characterized in that it comprises detecting means disposed in the output stage of a correlator for converting an output of the correlator into base band information and a high pass filter disposed in the output stage of the detecting means for removing at least frequency components from DC to about $1/\tau$ contained in the output of the detecting means, $\tau$ being the gate delay time of the correlator.

Even if correlation spikes are superposed on spurious signals, since variations in the spurious noise are suppressed by the construction described above, errors in the reproduced data are decreased.

BRIEF DESCRIPTION OF THE DRAWINGS

FIG. 1 is a block diagram indicating the construction of an embodiment of the present invention;

FIGS. 5(a)-5(d) and 6(a)-6(b) are schemes of waveform for explaining the operation of the device disclosed in the older application.

DETAILED DESCRIPTION

Figure 2A:
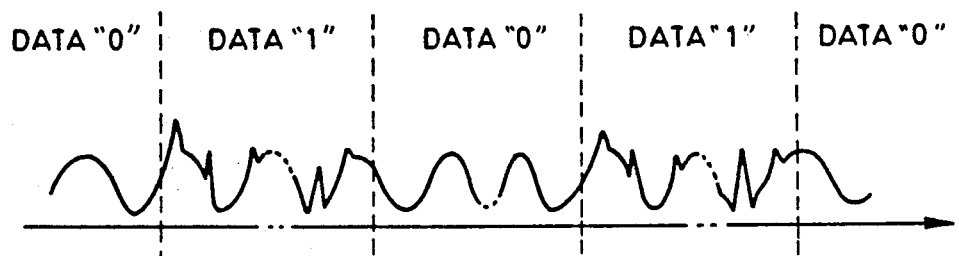
FIGS. 2(a)-2(c) show a scheme of waveform for explaining the operation thereof.

Hereinbelow the present invention will be explained, referring to the embodiments indicated in the drawings. FIG. 1 shows an embodiment of the SS communication receiver according to the present invention, in which reference numeral 1 is a receiving antenna; 2 is a band pass filter; 3 is an amplifier; 4 is a mixer; 5 is a local oscillator; 6 is an AGC amplifier; 7 is a band pass filter; 8 is a carrier oscillator; 9 is a mixer; 10 is a PN code generator; 11 is a clock generator; 12 is a correlator (e.g. SAW convolver); 13 is an amplifier; 14 is a band pass filter; 15 is a detecting circuit; 16 is a low pass filter; 17 is a high pass filter; 18 is a comparator circuit; 19 is a pulse width enlarging circuit; 20 is a low pass filter; and 21 is a waveform shaping circuit.

In the construction indicated in FIG. 1 the parts denoted by 1~12 and 18~21 are identical to those described in the older application stated above and therefore explanation thereof in detail will be omitted. The circuits added particularly according to the present invention are those denoted by 13~17 and the operation of these circuits will be explained below.

At first, the output of the correlator 12, in which CW disturbing waves are mixed, is amplified to a suitable level. The output thereof is given to the band pass filter 14 and unnecessary components produced by non-linearity of the correlator 12 are removed by the filter 14.

Next, this output of the filter is subjected to square-law detection or envelope detection by the detector 15 and thereafter unnecessary harmonic waves are removed by the low pass filter 16. In this way, a signal is obtained, which is the radio frequency correlation output frequency-shifted to the base band, as indicated in FIG. 2(a). Here, by the square-law detection or the envelope detection, the spectre components of variations in the spurious noise exist as frequency components mainly from DC to $1/\tau$ (inverse of the gate delay time $\tau$ of the correlator).

Figure 2C:
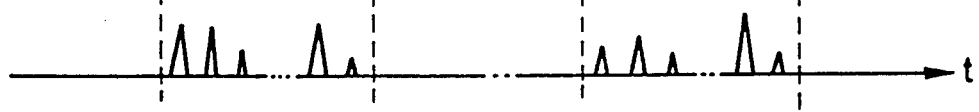
Figure 2B:
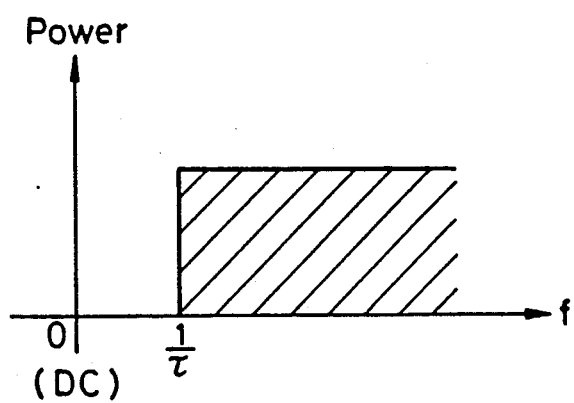

The high pass filter 17 is a filter for removing the spectre components from DC to $1/\tau$, as indicated in FIG. 2(b). For example, when a convolver (gate length 10 μsec) is used for the correlator 12, it is a filter, which removes the spectre components from DC to 100 kHz. When the output of the detecting circuit 15 is made pass through this high pass filter, an output is obtained, which has a waveform, in which variations in the spurious noise are suppressed, as indicated in FIG. 2(c).

After the output of the high pass filter 17 the signal is dealt with by the construction after the comparator circuit 18.

By adding the construction as described above, since variations in the spurious noise are suppressed, as indicated in FIG. 2(c), it is possible to decrease errors in the reproduced data.

Figure 3:
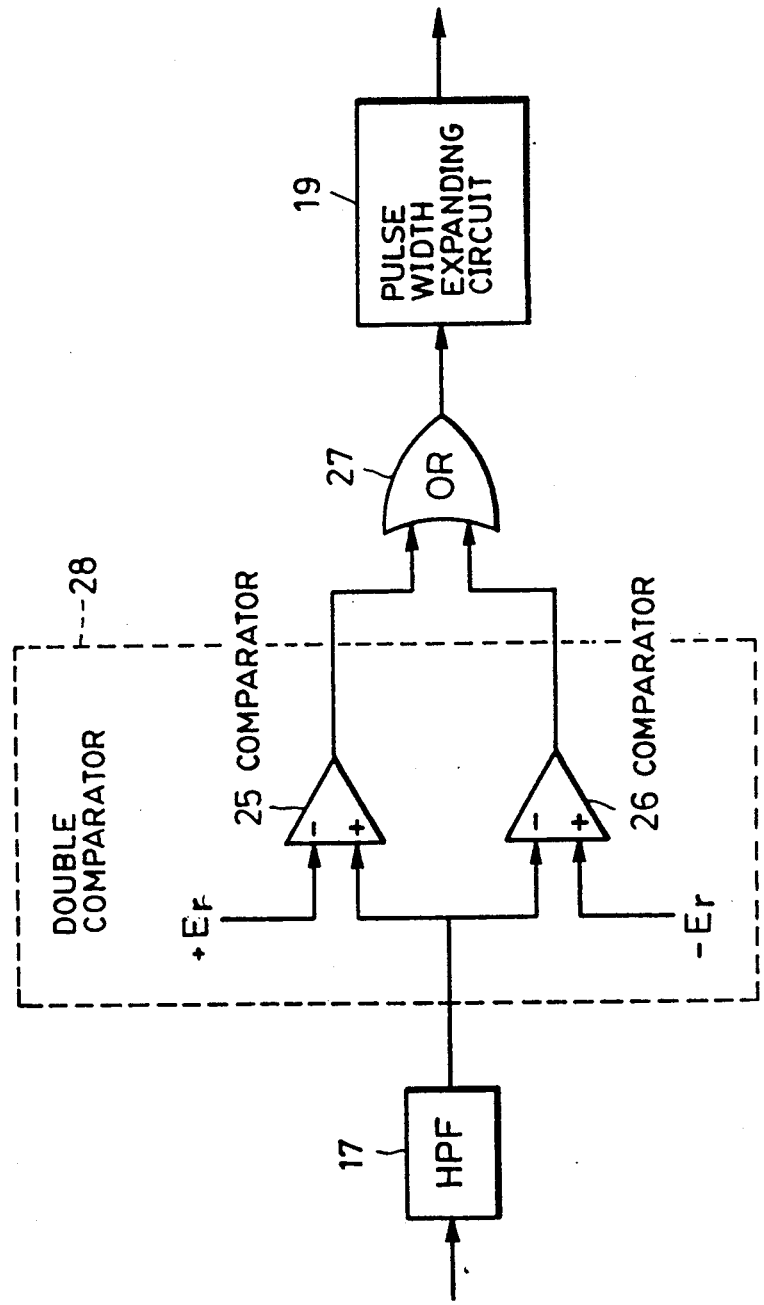
FIG. 3 is a block diagram indicating the principal part of another embodiment of the present invention.

FIG. 3 shows another embodiment of the present invention, in which the comparator circuit 18 in FIG. 1 is constituted by comparators 25 and 26 and an OR circuit 27. A positive and a negative reference voltage $+E_R$ and $-E_R$ are applied to ones of the inputs of the comparators 25 and 26, respectively.

Figures 4A, 4B:
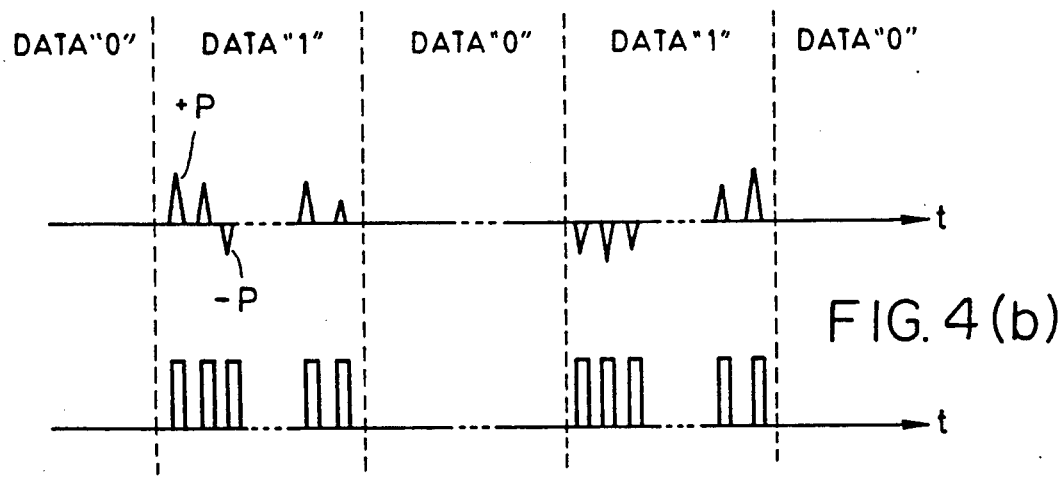
FIGS. 4(a)-4(b) show a scheme of waveform for explaining the operation thereof.
Figure 6A:
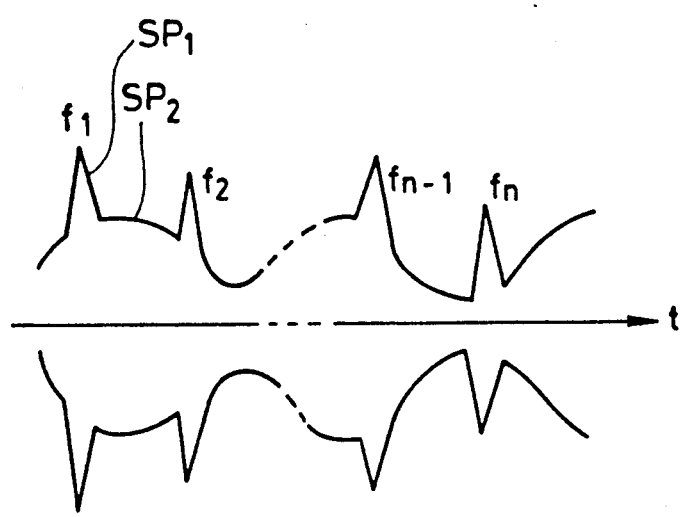
Figure 6B:
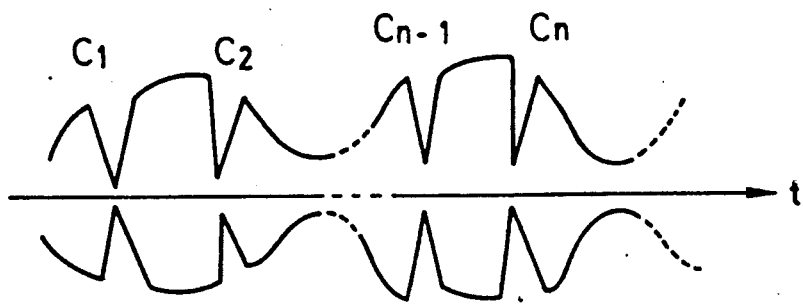

A double comparator section consisting of the comparators 25 and 26 detects both the kinds of correlation spikes in the case where, when the correlation spikes are superposed on the spurious noise in a time region, the phase relation of the correlation spikes with respect to the spurious noise at the peak point of the correlation spikes is in the regions of $-\pi/2 \sim \pi/2$ and $\pi/2 \sim 3\pi/2$. The correlation spikes after the passage through the high pass filter are detected, depending on the phase relation thereof with respect to the spurious noise, as indicated in FIG. 4(a). That is, the positive correlation spikes generated when the superposition takes place in the region of $-\pi/2 \sim \pi/2$ are detected by the comparator 25 and the negative correlation spikes generated when the superposition takes place in the region of $\pi/2 \sim 3\pi/2$ are detected by the comparator 26.

The OR circuit 27 combines positive and negative correlation spikes (correlation pulses) $+p$ and $-p$, pulsed by the double comparator section 28, as indicated in FIG. 4(b).

Data reproduction characteristics are further improved by constructing the receiver so that the negative correlation spikes can be also detected as described above.

As explained above, according to the present invention, in an SS receiver, since variations in the spurious noise are suppressed, it is possible to decrease errors in the reproduced data.

The embodiments of the invention in which an exclusive property or privilege is claimed are defined as follows:

1. A spread spectrum receiver comprising:
    a reference signal source for generating a reference signal;
    a correlator, in which a received signal and a reference signal are inputted to obtain a correlation output;
    detecting means coupled to said correlator for converting an output of said correlator into base band information which includes frequency components; and
    a high pass filter coupled to said detecting means for removing from said base band information at least the frequency components thereof which are in a frequency range bounded by frequencies of zero and approximately $1/\tau$, $\tau$ being a gate delay time of said correlator.

2. A spread spectrum receiver according to claim 1, further comprising:
    double comparator means including a first comparator section for comparing an output of said high pass filter with a positive reference voltage and a second comparator section for comparing the output of said high pass filter with a negative reference voltage; and an OR circuit into which an output of said first comparator section and an output of said second comparator section are inputted.

3. A spread spectrum receiver according to claim 1, wherein:
said detecting means is a square-law detector or an envelope detector, and
including a low pass filter for removing unnecessary harmonic waves, said low pass filter having an input to which is applied said base band information from said detecting means and having an output which is coupled to an input of said high pass filter.

4. A spread spectrum receiver according to claim 1, wherein said high pass filter removes from said base band information the frequency components in a frequency range of 0~100 kHz.

* * * * *